United States Patent [19]
Rikkinen

[11] Patent Number: 6,014,550
[45] Date of Patent: *Jan. 11, 2000

[54] DATA TRANSMISSION METHOD, TRANSMITTER, AND RECEIVER

[75] Inventor: Kari Rikkinen, Oulu, Finland

[73] Assignee: Nokia Mobile Phones, Ltd., Espoo, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/398,890

[22] Filed: Mar. 6, 1995

[30] Foreign Application Priority Data

Mar. 7, 1994 [FI] Finland .................................... 941072

[51] Int. Cl.$^7$ ...................................................... H04B 1/10
[52] U.S. Cl. ............................................. 455/63; 455/67.1
[58] Field of Search ........................ 455/63, 67.1, 67.4, 455/69, 70, 422, 524, 517; 375/231, 233, 261, 358, 325, 364, 365, 187, 188, 363; 371/32, 34; 370/311, 514, 335, 350, 341, 320, 342, 441

[56] References Cited

U.S. PATENT DOCUMENTS

| | | | |
|---|---|---|---|
| 5,031,193 | 7/1991 | Atkinson et al. | 375/13 |
| 5,212,689 | 5/1993 | Eriksson | 370/106 |
| 5,265,128 | 11/1993 | Widmer et al. | 375/58 |
| 5,396,653 | 3/1995 | Kivari et al. | 455/88 |
| 5,475,713 | 12/1995 | Bremer et al. | 375/261 |
| 5,857,147 | 8/1999 | Gadner et al. | 455/67.1 |

FOREIGN PATENT DOCUMENTS

| | | |
|---|---|---|
| 0241954 | 10/1987 | European Pat. Off. |
| 0314962 | 5/1989 | European Pat. Off. |
| 0333679 | 9/1989 | European Pat. Off. |
| 0391783 | 10/1990 | European Pat. Off. |
| 0440284 | 8/1991 | European Pat. Off. |
| 0566551 | 10/1993 | European Pat. Off. |
| WO 92/12602 | 7/1992 | WIPO . |

OTHER PUBLICATIONS

TIA/EIA Interim Standard, "Mobile Station–Base Station Compatibility Standard for Dual–Mode Wideband Spread Spectrum Cellular System" Jul. 1993, Telecommunications Industry Association.

IEEE, 1993, "Coherent Detection With Reference–Symbol Based Channel Estimation For Direct Sequence CDMA Uplink Communications" F. Ling Motorola, Inc.

Finnish Office Action and English Translation thereof, Nokia Mobile Phones Ltd., Application No. 941072.

*Primary Examiner*—Reinhard J. Eisenzopf
*Assistant Examiner*—Marsha D. Banks-Harold
*Attorney, Agent, or Firm*—Perman & Green, LLP

[57] ABSTRACT

The invention relates to a data transmission method in a cellular communications system comprising in each cell at least one base station communicating with mobile stations within its coverage area, in which method extra known reference information is added to a transmit signal. To enable smooth estimation of a channel, the amount of added reference information per time unit is varied in response to the radio channel parameters. The invention also relates to a transmitter having means for encoding (41), interleaving (41) and modulating (48) the transmit signal. The transmitter of the invention comprises means (42) for combining known reference symbols with the transmit signal and means (45) for controlling the combination. The invention further relates to a receiver having means for demodulating (51) and decoding (61) a received signal and means (51) for deinterleaving the signal. The receiver of the invention comprises means (52, 66) for removing the known reference symbols from the received signal and means (54) for controlling the removal of the reference symbols.

17 Claims, 3 Drawing Sheets

DATA TRANSMISSION METHOD, TRANSMITTER, AND RECEIVER

BACKGROUND OF THE INVENTION

The present invention relates to a data transmission method in a cellular communications system comprising in each cell at least one base station communicating with mobile stations within its coverage area, in which method extra known reference information is added to a transmit signal.

In a cellular communications system the quality and parameters of a radio channel may vary greatly as a function of time and location. When a mobile station is stationary, the radio channel is nearly invariant. When the station is on the move, the radio channel varies as a function of time on account of the mobility of the station and the multipath propagation of the radio signal. In such a constantly changing situation, it is difficult to achieve reliable data transmission. Channel coding, signal interleaving and coherent data transmission may be employed to improve transmission quality. In certain cases, transmission quality may also be improved by employing multilevel signals, such as a multilevel orthogonal or biorthogonal signal, in transmitting the data signal.

The prerequisite for applying coherent reception is a carrier phase estimate for the receive signal, and also an estimate of the radio channel if optimum performance is desired. Channel estimation may be carried out by transmitting either a separate pilot signal, known reference symbols, or a mere data signal.

The pilot signal method employs a separate continuous narrowband or wideband signal to generate a phase reference estimate. *EIA/TIA Interim Standard; Mobile Station—Base Station Compatibility Standard for Dual-Mode Wideband Spread Spectrum Cellular System*, TIA/EIA/IS-95, July 1993, specifies a method employing a separate pilot channel on which a predetermined data unmodulated signal is sent. Adding a separate pilot channel to the transmission takes up part of the available transmission capacity, renders the transmitter and receiver constructions complex, and may necessitate expansion of the requisite transmission bandwidth. Therefore, a separate pilot channel is unfeasible, particularly in the transmission direction from mobile to base (uplink). In the CDMA multiple access method, however, a pilot channel may have utility in the transmission direction from base to mobile (downlink).

Channel estimation by means of a data signal may be implemented either by means of decision feedback or without feedback. In these methods, channel estimation does not necessitate expanding the required transmission bandwidth. Estimation making use of a data signal is, however, poorly suited to the transmission path environment of cellular systems. When decision feedback is employed, the problem resides in the unreliability of the decisions applied. On the other hand, without feedback the required channel estimation circuit is difficult to implement, particularly when multilevel signals are employed.

Prior art methods based on the use of known reference symbols are attended by the drawback that they do not take account of the state of the radio channel. A prior art method for using reference symbols is described in Fuyun Ling, *Coherent Detection with Reference Symbol Based Channel Estimation for Direct Sequence CDMA Uplink Communication*, IEEE Vehicular Technology Conference 1993 incorporated herein by reference. This publication describes a method in which a mobile station transmits reference information at regular intervals to a base station. Thus the channel is always measured at a constant frequency by means of reference symbols fully independently of the rate of change of the channel. The symbol transmission rate, i.e. the number of symbols sent in a time unit, is dependent on how rapid measurement of the changing channel is desired and what amount of transmission capacity (power or bandwidth) is to be allocated for these known symbols. The object is to achieve a sufficient channel measurement accuracy while utilizing a minimum of transmission capacity. At a constant frequency, the solution is always a compromise between these two factors, and the result cannot be an ideal solution in conditions of varying channel measurement needs.

Another known method is disclosed in Finnish Patent Application 940148, in which a mobile station transmits known reference symbols with frame symbols corresponding to those employed by the base station in sending power adjustment commands to the mobile station. Also in this method, the amount of reference information is not dependent on the rate of change of the channel but on the amount of power adjustment information sent by the base station, and this is not directly proportional to the rate of change of the channel.

SUMMARY OF THE INVENTION

In accordance with a first aspect of the invention there is provided a data transmission method in a cellular communications system comprising in each cell at least one base station communicating with mobile stations within its coverage area. In which known reference information is added to a transmit signal, characterized in that the amount of added reference information per time unit is varied in response to the state of the radio channel.

In accordance with a second aspect of the invention there is provided a transmitter, having means for encoding, interleaving and modulating the transmit signal, characterized in that it comprises means for combining known reference symbols with the transmit signal and means for controlling the combination.

In accordance with a third aspect of the present invention there is provided a receiver, having means for demodulating and decoding a received signal and means for deinterleaving the signal, characterized in that it comprises means for removing the known reference symbols from the received signal and means for controlling the removal of the reference symbols.

It is thus an advantage of the present invention that a method enabling smooth channel estimation at the receiver is provided. The number of transmitted reference symbols in a time unit can be optimized to the channel state at a given time.

The reference symbols are symbols known to the receiver typically inserted into a sequence of data symbols. The reference symbols received are used to generate a channel estimate. There are no decision errors or phase ambiguities as the reference symbols are known so a more robust method of channel estimation is achieved.

The invention provides a way of sending reference information as required by coherent detection which is adaptable to the channel state at each given time. The method can be implemented in both transmission directions, but it is particularly suitable for use in the uplink direction in which methods making use of a continuous pilot signal have no utility. The coherent detection enabled permits operation of the receiver in the uplink direction with a considerably poorer signal-noise ratio than in non-coherent reception. This again affords a greater capacity per cell in CDMA systems.

Besides coherent detection, the invention can also be implemented in other aspects of synchronization and power measurement at a receiver. The channel estimate obtained by way of known reference symbols can be used for code and bit synchronization and as an aid in measuring the receive signal power.

Since in the invention only the required number of known reference symbols are transmitted, said number being adjusted at a given time in response to the channel quality, utilization of the transmission capacity of the channel can be effectively optimized. The channel can always be monitored with the desired accuracy, but on the other hand no superfluous transmission capacity is allocated when the channel quality is good.

In the following, the invention will be explained in greater detail with reference to the examples in accordance with the accompanying drawings, in which

DETAILED DESCRIPTION OF THE INVENTION

In accordance with the invention, the transmitter adds reference symbols to the transmit signal in such a way that the number of symbols per time unit can be varied depending on the state of the radio channel, determined by evaluating the values of one or more channel parameters. The channel parameters may include received signal amplitude and phase, multipath delay, the amplitude and phase of components of the multipath and the received signal power level. The receiver is aware of the number of reference symbols sent at a given time and of their location in the signal. The channel is estimated on the basis of these reference symbols for coherent reception and other functions of the receiver.

Figure 1A:
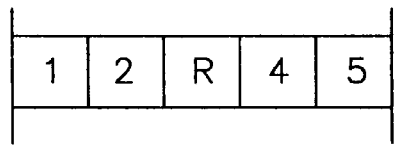
FIGS. 1a–1c illustrate adding of reference symbols to a transmit signal.
Figure 1B:
Figure 1C:
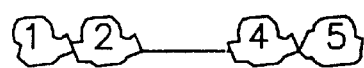

FIGS. 1a–1c and 2a–2c illustrate two possible methods of adding reference symbols to the transmit signal. The addition can be realized either by inserting the reference symbols between the data symbols or by replacing some of the data symbols with reference symbols. The fact-mentioned method is termed puncturation and is illustrated in FIGS. 1a–1c. FIG. 1a shows an example of a part of the frame structure of the transmitted signal. Reference symbol R has been added in between data symbols 1–5 by replacing data symbol 3 with the reference symbol. FIG. 1b shows an example of a received signal corrupted by the transmission path. In the receiver, the reference symbol is removed from the data signal and a zero symbol is inserted in its place. This is illustrated in FIG. 1c.

Figure 2A:
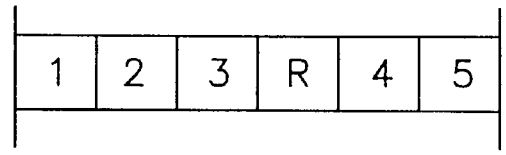
FIGS. 2a–2c illustrate another embodiment of adding reference symbols to the transmit signal.
Figure 2B:
Figure 2C:

FIG. 2a illustrates a situation where reference symbol R has been added in between transmit data symbols 1–5. FIG. 2b shows the corresponding received signal corrupted by the transmission path. In the receiver, the reference symbols are removed from among the data symbols, and thus in the exemplary case the received frame is as shown in FIG. 2c. In contrast to puncturation, this method will increase the transmission bandwidth required by the transmit signal.

Figure 3A:
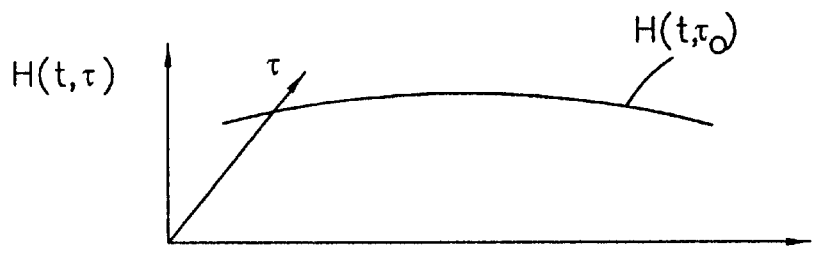
FIGS. 3a–3d illustrate transmission of reference symbols under different channel quality conditions.
Figure 3B:
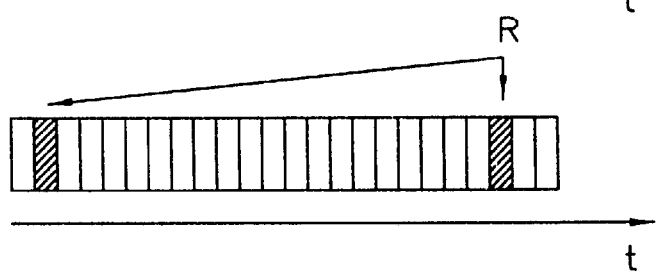
Figure 3C:
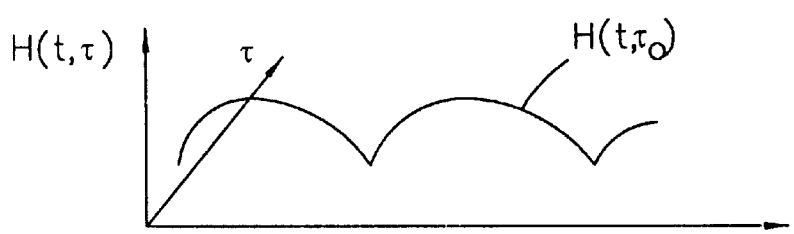
Figure 3D:
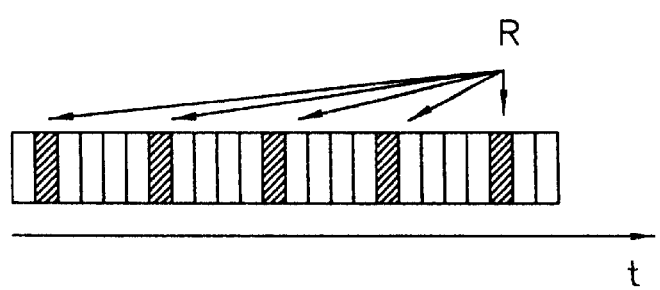

FIGS. 3a–3d illustrate the performance of the solution in accordance with the invention in different situations. FIG. 3a shows the impulse response of a transmission channel with a slow rate of change. In such a case, the number of requisite reference symbols R per time unit is small, as is apparent from FIG. 3b. The reference symbols may be sent by puncturation of data symbols. It is also possible to insert them between date symbols, as they do not appreciably expand the requisite bandwidth. When the transmission channel changes rapidly, the impulse response being in accordance with FIG. 3c, the number of reference symbols R to be sent is increased in accordance with FIG. 3d and new reference symbols are inserted in place of date symbols by puncturing. In such a case, the required transmission bandwidth no longer increases. The reference symbols may be added to the transmission one by one at given time intervals or in sets of several symbols.

The number of reference symbols per time unit may be adjusted either randomly or in predetermined steps. The latter alternative affords a simpler implementation.

The invention can also be used when the transmission channel has a slow rate of change, and reference symbols are sent in accordance with Finnish Patent Application 940148, in which a mobile station transmits known reference-symbols with frame symbols corresponding to those employed by the base station in sending power adjustment commands to the mobile station. Thus both transmission directions employ an identical frame structure, and in those symbol positions in the frame in which the base station sends power adjustment commands to the mobile station, the mobile station sends predetermined reference symbols to the base station. Thus in the uplink direction the sending of reference symbols requires no bandwidth expansion. When the transmission channel changes rapidly, the number of reference symbols per time unit is increased and new reference symbols are inserted into the transmit signal by puncturing, as set out previously.

The invention can also be used with multilevel symbols, such as orthogonal or biorthogonal symbols, that are employed in data signal transmission in a cellular network. The invention can also be used advantageously when the signal is encoded by a combination of a convolutional code and a biorthogonal multilevel symbol set, such as disclosed in Finnish Patent Application 935047. The advantages of both methods can be combined, in other words, the advantageous method of the present invention can be applied to realize the coherent detection required by the combined encoding referred to above, thus achieving a reliable transmission quality. The capacity gain achieved is considerable, specifically in the CDMA multiple access method.

When multilevel symbols are used in the data signal transmission, the reference symbols can be sent in the form of multilevel symbols identical to the data symbols. Such a system is described in copending Finnish application 941071. Multilevel reference symbols can be sent by adding them in between data symbols or by replacing a data symbol with a reference symbol.

The invention can be implemented in cellular networks irrespective of the multiple access method applied. The invention is most advantageous in cellular networks with continuous transmission, such as those applying FDMA and CDMA multiple access methods.

The invention can thus be implemented in both transmission directions, both from base to mobile and vice versa. In the following, a transmitter and a receiver of the invention will be described by way of illustration, the invention being implemented in the uplink direction in the context of a CDMA cellular network but not being limited thereto.

Figure 4:
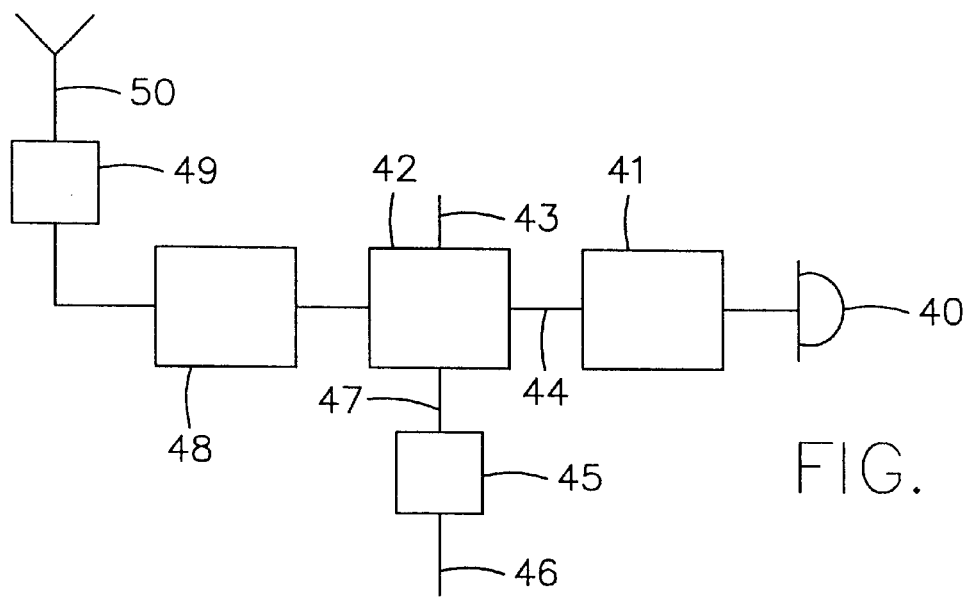
FIG. 4 illustrates the construction of a transmitter of the invention.

FIG. 4 illustrates the construction of a transmitter of the invention, using a CDMA transmitter as an example. The transmitter comprises a microphone 40 and means 41 for encoding and interleaving the transmit signal. The encoded and interleaved bits 44 are applied to an input of a combination circuit 42. Known reference symbols are applied to a second input 43 of the combination circuit. The combination circuit 42 inserts the reference symbols into the transmit data, either between data symbols or in their place. Control means 45 provides control 47 for the combination circuit and determines by which method and at how short intervals reference symbols are to be inserted into the data. The operation of the control means 45 is based on the state of the transmission channel, and the impulse 46 to the control means may be provided by the measured Doppler frequency or a control command from the receiving end (e.g. base station), for example. The control may be based on monitoring the quality of the receive signal, which may be realized for instance by monitoring the bit error ratio or signal-noise ratio of the receive signal. In the case of a CDMA transmitter, the signal provided by the combination circuit is spread by a spreading code and modulated by means 48, and applied through radio-frequency parts 49 to an antenna 50. The transmitter naturally also comprises other components, such as converters and filters, which for clarity are not shown in the figure.

Figure 5:
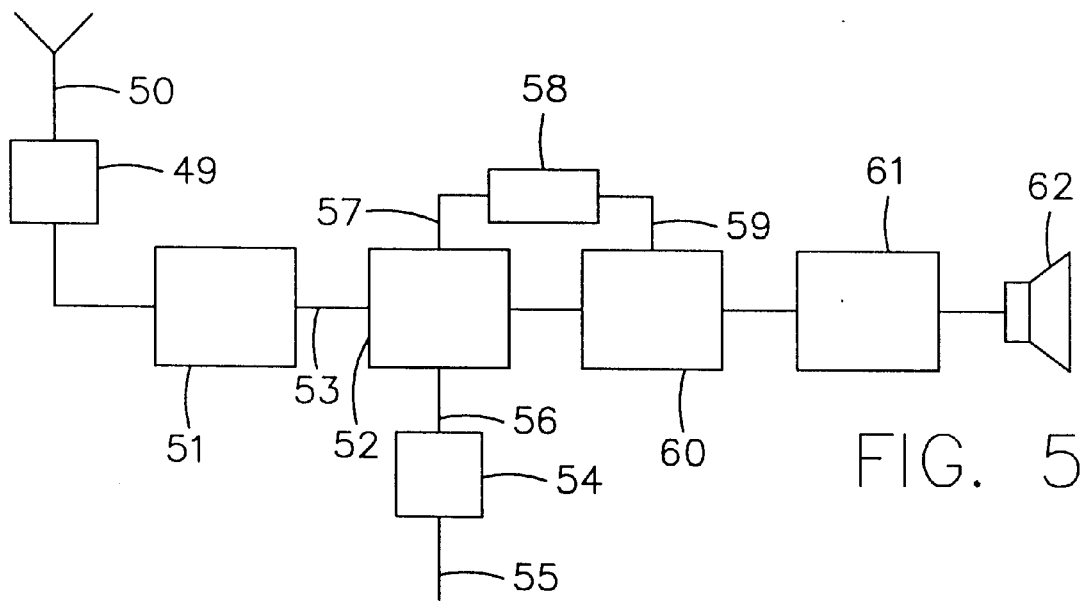
FIG. 5 illustrates the construction of a receiver of the invention.

FIG. 5 illustrates the construction of a receiver of the invention, using a CDMA receiver as an example. The receiver comprises an antenna 50, from which the signal is applied through radio-frequency parts 49 to a demodulation and despreading block 51. The signal is further applied to a separation circuit 52 in which known reference symbols 57 are separated from the remainder of the received signal 53 and applied to a channel estimation block 58. The control signal 56 for the separation circuit is provided by the control circuit 54, which needs information 55 on the combined control employed at the transmitting end. In a preferred embodiment of the invention, this information may be available at the receiver, for example if the receiving end (e.g. a base station) determines the mode of operation of the transmitting end. In another preferred embodiment of the invention, the transmitting end sends information on the operational mode to the receiver. The information may be transmitted on a signalling channel or along with the actual data signal. In accordance with a third preferred embodiment of the invention, the state of the transmission channel is measured by the receiver, and the control of the separation circuit is based on this measurement. In accordance with a fourth advantageous embodiment of the invention, the information on the combined control employed at the transmitting end is obtained by measuring the received signal.

The output 59 of the estimation circuit 58 provides an estimate of the transmission channel, which permits coherent detection of the data signal to be performed by means 60. Subsequent to deinterleaving and decoding 61, the detected signal is applied to a loudspeaker 62. The estimate 59 can also be employed for other purposes, such as synchronization or power measurement. The receiver naturally also comprises other components, such as converters and filters, which for clarity are not shown in the figure.

Figure 6:
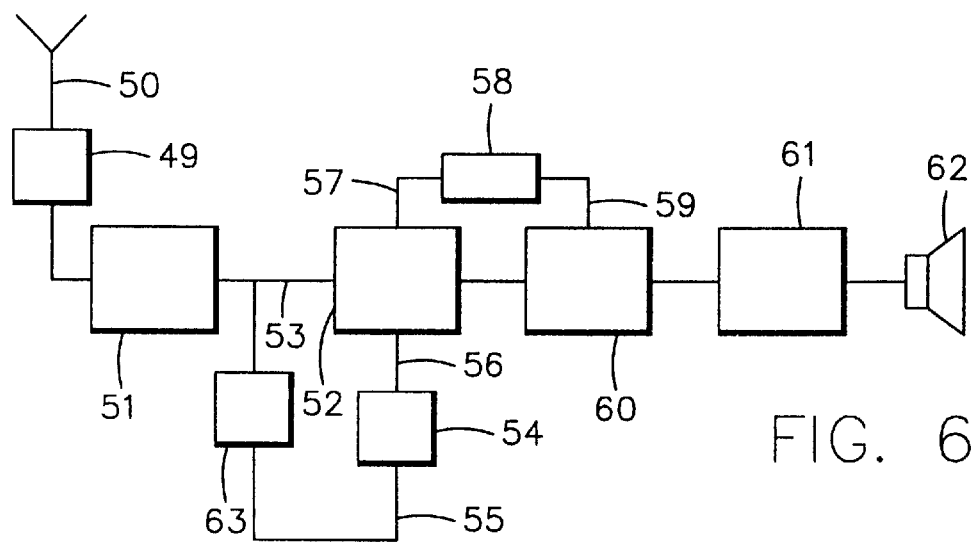
FIG. 6 illustrates an alternative construction for the receiver of the invention.

FIG. 6 illustrates the construction of a receiver implementing a fourth embodiment of the invention. The receiver comprises means 63 for detecting the location and number of reference symbols in the received transmission, i.e. In the signal obtained from block 51. These means 63 provide a control signal 55 to means 54 controlling the removal of reference symbols.

Figure 7:
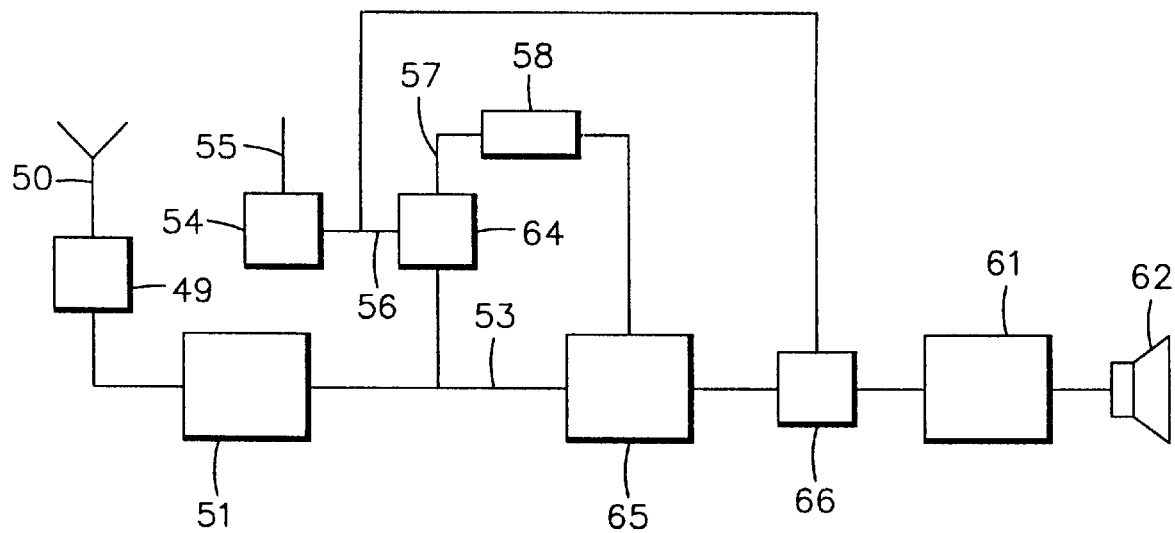
FIG. 7 illustrates the construction of a third embodiment of the receiver of the invention.

FIG. 7 illustrates the construction of a receiver implementing a further embodiment. The receiver comprises means 64 for separating reference symbols from the received signal. The separation means are controlled by control circuit 54, as above. The channel is estimated in estimation block 58 by means of reference symbols as set out previously. The receiver comprises means 65 for detecting the received signal which includes the desired data and reference symbols. The detection may be coherent, in response to information provided by estimation block 58. The detected signal is applied to means 66 in which the reference symbols are removed from the detected'signal. Control block 54 provides a control signal to means 66.

Even though the invention has been explained in the above with reference to examples in accordance with the accompanying drawings, the invention is not restricted to them but can be modified in a variety of ways within the scope of the inventive idea disclosed.

What is claimed is:

1. A data transmission method for a cellular communication system having, in each cell, at least one base station communicating with mobile stations within the base station's coverage area via a radio channel, comprising the steps of:
   adding known reference symbols, having location and information content that are known in advance by the mobile stations, to a transmit signal, having user data symbols;
   measuring parameters that represent a state of the radio channel from a received signal; and
   varying the amount of reference symbols that are added to the transmit signal per time unit in response to the state of the radio channel.

2. A method as claimed in claim 1, wherein the step of varying the amount of reference symbols that are added to the transmit signal includes adding a lesser amount of reference symbols to the transmit signal when the state of the radio channel is satisfactory then when the state of the radio channel is unsatisfactory.

3. A method as in claim 1, further comprising a step of utilizing the reference symbols in a coherent receiver to generate a carrier phase reference.

4. A method as in claim 1, further comprising the step of utilizing the reference symbols in a receiver for symbol synchronization.

5. A method as in claim 1, further comprising the step of utilizing the reference symbols in a receiver for power measurement.

6. A method as in claim 1, wherein the step of adding known reference symbols to the transmit signal includes inserting the known reference symbols between the user data symbols.

7. A method as in claim 1, wherein the step of adding known reference symbols to the transmit signal includes replacing a set of the user data symbols with the known reference symbols.

8. A method as in claim 1, wherein the step of adding known reference symbols to the transmit signal includes utilizing multilevel symbols as the known reference symbols and transmitting the known reference symbols in the form of multilevel symbols that are identical to the user data symbols.

9. A method as in claim 1, further comprising the steps of:

controlling the transmit power of the mobile stations located within the base station's coverage area by way of power adjustment messages sent from the base station;

employing an identical frame structure on a traffic channel of the radio channel in both transmission directions from the base station to the mobile station and from the mobile station to the base station; and transmitting from the base station to the mobile station a power adjustment message employing specific bit time slots in the frame structure of the traffic channel, as the mobile station transmits the known reference symbols in the corresponding bit time slots of the other transmission direction of the traffic channel to the base station.

10. A method as claimed in claim 1, wherein the step of adding known reference symbols to a transmit signal, and the step of varying the amount of reference signals that are added to the transmit signal per time unit are controlled by the receiver.

11. A method as in claim 1, further comprising the step of:

employing an identical frame structure on a traffic channel of the radio channel in both transmission directions from the base station to the mobile station and from the mobile station to the base station;

wherein the step of varying the amount of reference symbols that are added to the transmit signal is controllable for both transmission directions simultaneously, or for each transmission direction separately.

12. A method as claimed in claim 1, wherein the steps of adding known reference symbols to the transmit signal, measuring parameters that represent the state of the radio channel from the received signal, and varying the amount of reference signals that are added to the transmit signal per time unit are controlled by the base station.

13. A method as claimed in claim 1, wherein the steps of adding known reference symbols to the transmit signal, measuring parameters that represent the state of the radio channel from the received signal, and varying the amount of reference signals that are added to the transmit signal per time unit are controlled by the mobile station.

14. A method as claimed in claim 1, further comprising the step of informing a receiver of the amount and location of the known reference symbols that were added to the transmit signal.

15. A method as claimed in claim 1, further comprising the step of detecting the amount of the known reference symbols added to the transmit signal from the received signal at a receiver.

16. A method as claimed in claim 1, wherein the steps of adding known reference symbols to the transmit signal, and varying the amount of reference signals that are added to the transmit signal per time unit is performed at a transmitting end, wherein the amount of reference symbols added to the transmit signal is based upon measuring parameters at a receiving end that represent the state of the radio channel, the measured parameters being signalled from a receiver to a transmitter.

17. A method as claimed in claim 1, wherein the steps of adding known reference symbols to the transmit signal, and varying the amount of reference signals that are added to the transmit signal per time unit is performed at a transmitting end, wherein the amount of reference symbols added to the transmit signal is based upon measuring parameters at a receiving section of a transmitting end that represent the state of the radio channel.

* * * * *